United States Patent [19]
Clark

[11] 3,841,660
[45] Oct. 15, 1974

[54] PICK-UP TRUCK RAIL ASSEMBLY AND TIE-DOWN DEVICE

[76] Inventor: Bob R. Clark, 6641 Hammond, Long Beach, Calif. 90805

[22] Filed: Dec. 18, 1972

[21] Appl. No.: 316,117

[52] U.S. Cl. .......................... 280/179 R, 248/226 R
[51] Int. Cl. ............................................. B60p 7/00
[58] Field of Search....... 280/179 R, 179 A; 296/43; 248/226 R, 226 B, 229; DIG. 14/3 J

[56] References Cited
UNITED STATES PATENTS
3,351,356  11/1967  Lark................................ 280/179 R
3,722,910  3/1973  Heckenlaible .................. 280/179 R
D188,181  6/1960  Gallagher...................... DIG. 14/3 J Primary Examiner—Robert R. Song

[57] ABSTRACT

A pick-up truck rail assembly and tie-down assembly that includes a novel adapter plate that permits the assembly to be removable mounted on the upper portions of the rear side walls of truck vehicles currently in production in the United States. Such vehicles have openings of various sizes and configurations defined in the upper portions of the side walls, but irrespective of the size or configuration, the present invention is removably engageable therewith, and when mounted on a vehicle adds an attractive appearance thereto as well as serving as a tie-down.

5 Claims, 7 Drawing Figures

PATENTED OCT 15 1974 3,841,660
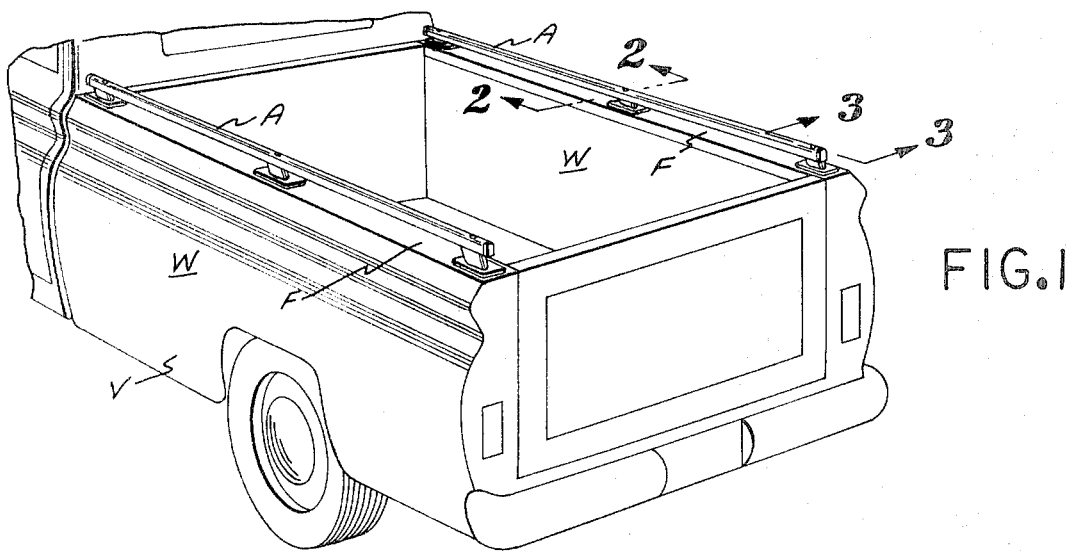
FIG.1
FIG.2
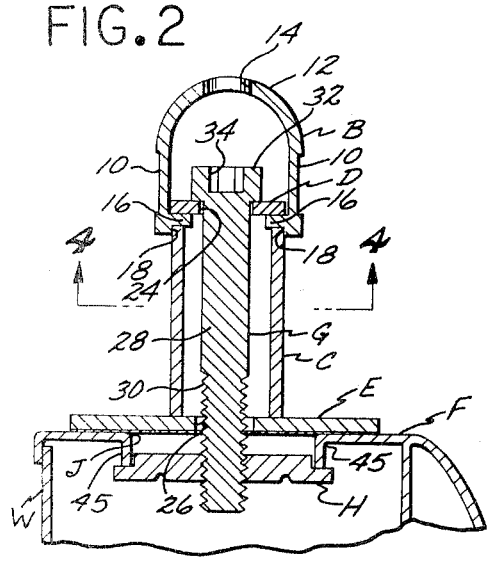
FIG.3
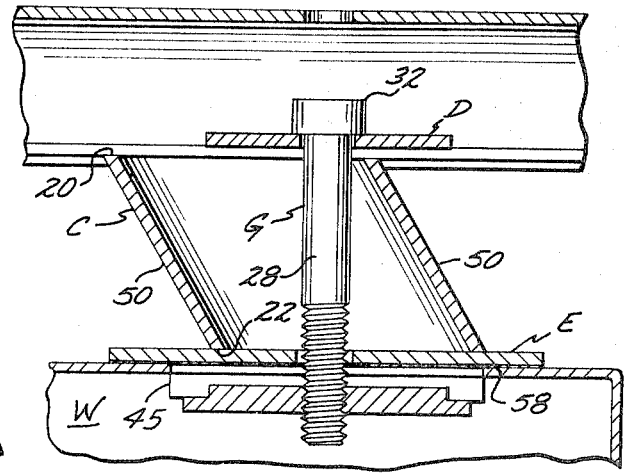
FIG.4
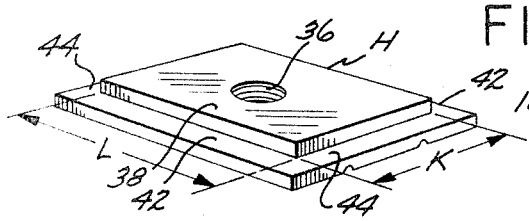
FIG.5
FIG.6
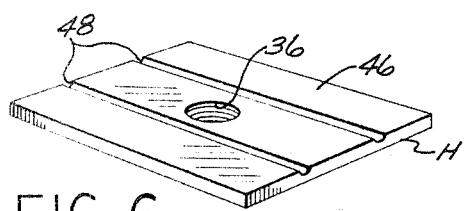
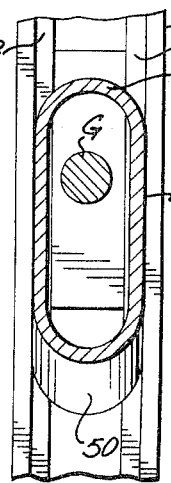
FIG.7
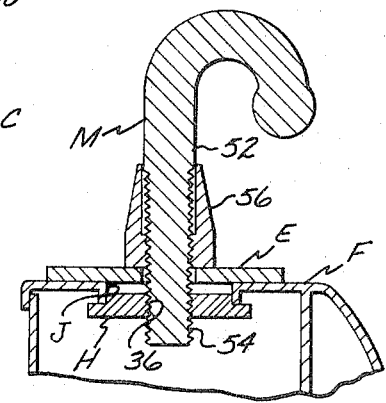

PICK-UP TRUCK RAIL ASSEMBLY AND TIE-DOWN DEVICE

BACKGROUND OF THE INVENTION

1. Field of the Invention

Pick-up rail assembly and tie-down device.

2. Description of the Prior Art

The conventional pick-up truck now in common usage includes a rearwardly disposed flat bed from which hollow side walls extend upwardly, with the upper portions of the side walls being defined by longitudinally extending flanges. The flanges have a series of longitudinally spaced openings formed therein, which openings may vary in width from one make of flat bed truck to another. The openings are provided in the flanges to receive stakes that serve to maintain a load in position on the bed.

However, in some instances it is not desirable to use stakes, and instead, longitudinally extending rails are removably supported above the flanges on the bed portion of the pick-up truck vehicle. Due to the various purposes for which a pick-up truck may be used, it is highly desirable that such rails be removable from the side wall portions of the pick-up truck, both as to the use of stakes on the truck as well as tie-down hooks.

SUMMARY OF THE INVENTION

An assembly adapted to be removably mounted in an elevated, longitudinally extending position, above the flange of the side wall of a flat bed truck, to define a rail that not only has an ornamental attractive appearance but may be used for tie-down purposes.

The assembly includes an elongate rail having a generally inverted U-shaped transverse cross section, a number of supports for the rail, a number of threaded members that engage both the rail and first and second members operatively associated therewith, as well as an adapter plate disposable within the confines of the side wall. Each of the plates is of rectangular shape and has a center tapped bore formed therein, and each plate has first and second sides. The first side has first and second engageable means of different spacing defined thereon, and the second side includes third engageable means which are spaced a distance that is preferably less than that of the first means. By use of either the first, second or third means, the rail assembly may be removably positioned on flat bed trucks having openings formed in the side wall flange portions thereof that are of first, second or third sizes and configurations. The rail assembly is adapted to be removably mounted on the wall portions of any one of the flat bed trucks currently being manufactured and sold in the United States.

The primary object in devising the present invention is to provide a rail assembly and tie-down device that is not only attractive in appearance, but one that has a relatively simple structure, and includes an adapter plate to permit the easy removable mounting on the side walls of any flat bed truck now in current production in the United States, irrespective of the size and configuration of the stake-receiving openings defined in the side walls.

BRIEF DESCRIPTION OF THE DRAWING

FIG. 1 is a perspective view of the bed portion of a conventional pickup truck with a pair of the rail assemblies removably mounted on the upper flange portions of the side walls that form a part of the truck structure;

FIG. 2 is a transverse cross-sectional view of one of the rail structures, taken on the line 2—2 of FIG. 1;

FIG. 3 is a fragmentary, longitudinal cross-sectional view of one of the rail assemblies, taken on the line 3—3 of FIG. 1;

FIG. 4 is a transverse cross-sectional view of one of the rail assemblies, taken on the line 4—4 of FIG. 2;

FIG. 5 is a perspective view of an adapter plate that permits the rail assembly assembly to be removably mounted on the side wall of a flat bed truck irrespective of the size of the openings in the flange portion of the side wall, and with the plate being shown with a first surface in an upwardly disposed position;

FIG. 6 is the same adapter plate as shown in FIG. 5, but with the second surface thereof being upwardly disposed, to show a pair of engageable grooves defined therein; and FIG. 7 is a vertical cross-sectional view of a tie-down hook removably mountable on the flange portion of the side wall of a flat bed truck and including the adapter plate shown in FIGS. 5 and 6 as a part of the hook assembly.

DESCRIPTION OF THE PREFERRED EMBODIMENT

A vehicle V is shown in FIG. 1 that includes two rearwardly disposed, laterally separated side walls W that extend upwardly from the bed of the vehicle, and each of the side walls includes a horizontal, longitudinally extending flange F. Two rail assemblies A are removably supported in elevated positions above the flanges F as shown in FIG. 1. Each of the assemblies A, as may be seen in FIGS. 1, 2 and 3, includes an elongate, longitudinally extending rail B that is held in an elevated position above the flanges F by a number of longitudinally spaced supports C. First and second members D and E are provided and are operatively associated with the rail B and supports C, as shown in FIGS. 2 and 3. The assembly A also includes a number of threaded members G that extend downwardly through the assembly as shown in FIGS. 2 and 3, and engage tapped, centered bores formed in adapter plates H, which plates are capable of holding the assembly in a removable position on the flanges F, irrespective of the size of the openings J formed in the flanges. The openings J in different makes of flat bed trucks not only vary as to width, but in some instances the side edges of the opening have downwardly extending ribs. However, irrespective of the width of the openings J or whether the openings are formed with downwardly extending ribs, the adapter plates H permit the assembly A to be removably mounted on the vehicle V, as shown in FIG. 1.

The rail B, as may best be seen in FIG. 2, is of a general inverted U-shaped transverse cross section and includes two laterally spaced sides 10. The rail includes an upper portion 12 in which a number of longitudinally spaced first bores 14 are formed. Two short legs 16 extend inwardly towards one another from the side 10, and are so spaced thereon as to cooperate therewith to define two longitudinally extending recesses 18, the purpose of which will later be explained. Each of the supports C, as may best be seen in FIG. 3, is of hollow structure and includes an upper edge 20 and a lower edge 22.

The members D, as shown in FIG. 2, are disposed within the confines of the rail B and rest on the upper surfaces of the legs 16. Each of the members D has a second bore 24 formed therein that is in vertical alignment with one of the first bores 14. Also, it will be seen in FIG. 2 that the recesses 18 engage the upper edge portions of the supports C, and as a result the supports C cannot rotate relative to the rails B, when the assembly A is positioned on the vehicle V, as shown in FIG. 1. The members E are longitudinally spaced along the flange F, and are of sufficient transverse cross section as to span the widest one of the openings J that will be encountered in the different makes of pick-up truck vehicles that have side walls W associated therewith.

Each of the second members E, as may be seen in FIG. 2, has a third bore 26 formed therein that is vertically aligned with one of the second bores 24. Each of the threaded members G includes a shank 28 that has threads 30 formed on at least the lower portion thereof, with the upper or first end of the shank having a head or protuberance 32 associated therewith, which head has a tool-engageable recess 34 formed therein. The recess 34 is preferably one that permits the threaded member to be removably engaged by an Allen wrench (not shown) that is extended down through one of the first bores 14.

Each of the adapter plates H is rectangular in shape, and has a centered tapped bore 36 defined therein. Each adapter plate H includes a first surface 38 on which a first and second pair of recesses 42 and 44 are defined. The first pair of recesses 42 define a distance K therebetween that is less than the distance L between the second pair of recesses 44, as may be seen in FIG. 5. When the adapter plates H are mounted within the confines of the side wall, they may be rotated for either the first or second pair of recesses 42 or 44 to engage the longitudinal edges of downwardly extending ribs that form a part of flange F and partially define 45 of the openings J.

Each plate H, as may be seen in FIG. 6, also includes a second side 46 in which a third pair of recesses 48 are defined, which recesses are preferably separated by a distance that is less than the distance K. When the ribs 45 of the openings J are separated by a distance less than the distance K, the plates H are disposed to have the second surface 46 upwardly disposed, and the ribs then engaging the third pair of recesses 48 shown in FIG. 5.

When the assembly K is disposed as shown in FIGS. 1, 2 and 3, and the members G rotated in the appropriate direction, the threads 30 rotate relative to the tapped bores 36, whereby the head 32 is moved downwardly, and in so doing, causes the first members D to pressure contact the upper surfaces of the legs 16. The legs 16 also pressure contact the upper surfaces of the supports C, and force the supports into pressure contact with the second members E. The second members E are forced into pressure contact with the upper surface of the flange F, with the adapter plates H being moved upwardly to pressure contact the lower longitudinal edges of the ribs 45.

The assembly A prior to being tightened into the position shown in FIG. 2, has the threads 30 on a shank 28 barely in engagement with a tapped bore 36 in an adapter plate H. The adapter plate H may then be slid downwardly at an angle through the opening J, and the adapter plate then moved to a horizontal position. The assembly A is then moved upwardly with a light force to seat the ribs 45 in the appropriate first, second or third pair of recesses 42, 44 or 48 and this upward force being maintained on shank 28 to prevent an adapter plate H from rotating as the shank is rotated to fully engage the tapped bore 36 until the position shown in FIG. 2 is attained.

The end portions of the supports C, as may best be seen in FIGS. 3 and 4, are of curved configuration, and for decorative purposes are preferably angularly disposed relative to the rail B.

Should it be desired, the plate H is adapted to be used in the same manner as above described in conjunction with a tie-down hook M that has a threaded shank 52 as illustrated in FIG. 7. The shank 52 extends downwardly through a second member E in the same manner previously described in conjunction with one of the threaded members G. The second member E engages upper surface portions of the flange F, as can be seen in FIG. 7. The threads 54 on the shank 52 are engaged by a nut 56.

After the threads 54 have been caused to engage the tapped opening 36, with the second member H disposed as shown in FIG. 7, the nut 56 is tightened to cause the second member E and plate H to be drawn into gripping contact with the flange F, to removably support the tie-down hook M in a fixed position thereon, and in much the same manner as the rail B is secured to the flange F. To prevent the second member E from defacing the upper surface of the flange F when in pressure contact therewith, the lower surface of the second member E may be coated with a resilient film of material 58 such as a synthetic resin, rubber or the like.

Should it be desired, resilient plugs (not shown) may be provided to be placed in the bores 14 after the rail assembly A has been mounted on the vehicle V, as shown in FIG. 1.

The use and operation of the invention has been previously explained in detail, and need not be repeated.

I claim:

1. In combination with a hollow sidewall of a bed of a pickup truck, which sidewall includes an upper elongate flange in which a plurality of longitudinally spaced rectangular openings are formed that are each partially defined by a transversely spaced, longitudinally extending pair of downwardly extending ribs, a rail assembly, that may be removably secured in a longitudinally extending position to said flange, said assembly including:

a. a rigid rail that has a generally U-shaped inverted transverse cross section and includes two laterally spaced, downwardly extending sides, which on the lower free ends thereof define two short first legs that extend inwardly towards one another, with said rail including an upper portion in which a plurality of longitudinally spaced first bores are formed that are vertically aligned with said openings in said flange when said rail is disposed in a longitudinal position thereabove;

b. first longitudinally extending means inside said rail that removably rest on said legs, said first means having a plurality of second bores formed therein longitudinally aligned with said first bores;

c. a plurality of hollow, longitudinally spaced supports, each of which supports have upper and lower edges, with a portion of said upper edges of each of said supports abutting against said legs, and with the hollow interior of each of said supports being in vertical alignment with said second bores;

d. second longitudinally extending means that rest on said flange and have a plurality of third bores formed bores therein vertically aligned with said second bores, said second means being of greater width than that of said openings;

e. a plurality of elongate threaded rods that have protuberances on first ends thereof that are of greater transverse cross section than that of said first bores, said protuberances resting on said first means, and said rods extending downwardly through said first, second and third bores to below said flange, each of which protuberances include tool engageable means thereon; and f. a plurality of rectangular, rigid adapter plates of greater width than said openings disposed in said sidewall below said openings, each of said adapter plates having a pair of spaced recesses therein that can engage said ribs, said adapter plates having centered tapped bores therein that engage said threaded rods, and with said rail assembly being rigidly secured to said flange when each of said threaded rods is rotated in a direction to force said first means into pressure contact with said legs, said legs into pressure contact with said supports, said supports into pressure contact with said second means, said second means into pressure contact with said flange, and said adapter plate into pressure contact with said ribs.

2. An assembly as defined in claim 1 wherein said legs are so disposed on said sides of said rail as to cooperate therewith to define two longitudinal, laterally separated recesses that interlock with said upper edges of said supports to prevent said supports from rotating relative to said rail when said threaded rods are in tightened positions.

3. An assembly as defined in claim 1 which further includes:

g. a resilient film on the side of said second means that contacts said flange to prevent said flange from being defaced by pressure contact with said second means.

4. An assembly as defined in claim 1 wherein said first means is a plurality of longitudinally spaced first rigid members formed from a rigid sheet material.

5. An assembly as defined in claim 1 wherein said second means is a plurality of longitudinally spaced second rigid members formed from a rigid sheet material.

* * * * *